United States Patent [19]

Kanno et al.

[11] Patent Number: 5,379,293
[45] Date of Patent: * Jan. 3, 1995

[54] VOICE PACKET ASSEMBLING/DISASSEMBLING APPARATUS

[76] Inventors: Shin Kanno, 4-4-4 Sakai, Musashino-shi, Tokyo; Tsukasa Tsujimura, 459-7-401 Inumakata, Urawa-shi, Saitama-ken; Masatsugu Yano, Tsushin Shisutemu Kenkyusho, 1-1 Ohfuna 5-chome, Kamakura-shi, Kanagawa 247; Hidenori Aoyagi, Tsushin Shisutemu Kenkyusho, 1-1 Ohfuna 5-chome, Kamakura-shi, Kanagawa 247; Hiroshi Kawawata, Tsushin Shisutemu Kenkyusho 1-1 Ohfuna 5-chome, Kamakura-shi, Kanagawa 247, all of Japan

[*] Notice: The portion of the term of this patent subsequent to Sep. 28, 2010 has been disclaimed.

[21] Appl. No.: 40,142

[22] Filed: Mar. 29, 1993

Related U.S. Application Data

[63] Continuation of Ser. No. 740,431, Aug. 5, 1991, Pat. No. 5,249,185.

[30] Foreign Application Priority Data

Aug. 3, 1990 [JP] Japan .................................. 2-207388

[51] Int. Cl.[6] .............................................. H04J 3/24
[52] U.S. Cl. .................................. 370/94.1; 370/94.2
[58] Field of Search ............... 370/43, 60, 60.1, 61, 370/94.1, 94.2, 99, 110.1, 112, 79, 82; 379/88; 381/29.30, 31.34

[56] References Cited

U.S. PATENT DOCUMENTS

| 4,750,171 | 6/1988 | Kedar et al. | 370/94.1 |
| 4,755,986 | 7/1988 | Hirata | 370/94.1 |
| 4,774,706 | 9/1988 | Adams | 370/94.1 |
| 4,903,261 | 2/1990 | Baran et al. | 370/94.2 |
| 4,908,821 | 3/1990 | Sirato | 370/94.1 |
| 4,920,534 | 4/1990 | Adelmann et al. | 370/94.1 |
| 4,977,556 | 12/1990 | Noguchi | 370/60 |
| 5,056,088 | 10/1991 | Price et al. | 370/94.1 |
| 5,148,429 | 9/1992 | Kudo et al. | 370/94.2 |

FOREIGN PATENT DOCUMENTS

| 27643 | 1/1990 | Japan . |
| 2143636 | 6/1990 | Japan . |

OTHER PUBLICATIONS

"Voice Packet System", NTT Communications Switching Laboratories, Kenjippo vol. 38, No. 3, pp. 231–237.
U. Manicke, "Uberblick uber den internationalen Stand spezieller LSI–Schaltkreise fur die PCM–Technik", Nachrichtentechnik, Electronik 31 (1981) H.3.
Translation from Piece of Pertinent Literature (1) RE P 41 25 422.8–31, Survey of the International level of special LSI circuits for the PCM technique.

*Primary Examiner*—Alpus H. Hsu

[57] ABSTRACT

A small and economical voice packet assembling/disassembling (PAD) apparatus, which includes only one packet assembler/disassembler for a plurality of channels. The packet assembler receives coded voice data from a plurality of CODECs provided for each channel, and assembles voice packets by using the coded voice data. The packet disassembler disassembles voice packets to coded voice data and supplies them to a plurality of CODECs provided for each channel.

14 Claims, 4 Drawing Sheets

VOICE PACKET ASSEMBLING/DISASSEMBLING APPARATUS

This application is a continuation of application Ser. No. 07/740,431 filed on Aug. 5, 1991, now U.S. Pat. No. 5,249,185.

BACKGROUND OF THE INVENTION

The present invention relates to a voice packet assembling/disassembling apparatus which assembles and disassembles voice packets in a voice packet communications system.

A voice packet communications system and apparatus are disclosed in "Voice packet system", K. Saito et al, Electrical Communication Laboratories Technical Journal of NTT, Vol. 38, No. 3, pp. 231–237, 1989.

FIG. 3 illustrates a schematic view of a voice packet communications system. In FIG. 3, voice terminal 1, such as a telephone set, is connected to a Private Branch Exchange (PBX) 2. The PBX 2 is connected to a voice Packet Assembler/Disassembler (PAD) 4 through an Interface (I/F) 3 which multiplexes 30 PCM channels. Interface 3 conforms to TTC of Japan or JJ-20.10, JJ-20.11 and JJ-20.12.

Voice signals input from the voice terminal 1 reach the voice PAD 4 via PBX 2 and I/F 3. In the voice PAD 4, input voice signals are coded to embedded ADPCM. The voice PAD 4 is connected to a packet multiplexer 6 via I/F 5 conforming to CCITT Recommendation X.21. The packet multiplexer 6 is connected to another packet multiplexer via high speed digital switch 7.

FIG. 4 illustrates a prior interleave process for assembling/disassembling packets containing upper bits and lower bits, respectively. In FIG. 4, the coded embedded ADPCM voice data are divided into upper bits and lower bits for each sample. Voice data for more than one sample are collected and assembled into respective packets for upper bits and for lower bits by the interleave process. Then The packets are multiplexed in the voice PAD 4.

Although the above explanation is concerned with transmission, the process of reception is generally the same, as explained below. The voice PAD 4 disassembles the received packets to coded embedded ADPCM voice data for each sample, decodes these data to voice signals, and sends them to the PBX 2.

FIG. 5 illustrates a prior voice packet assembling/disassembling apparatus which assembles and disassembles a voice packet. In FIG. 5, I/F 3 is connected to a PBX interface 8, and the PBX interface 8 is connected to each CODEC 9-1 to 9-30, and each CODEC 9-1 to 9-30 is connected to corresponding PAD 10-1 to 10-30. And all PADs 10-1 to 10-30 are connected to the packet multiplexing part 15 which contains a multiplexer 11 for multiplexing the voice signals, a CPU 13 for controlling all the blocks in the PAD 4, a data memory 12 and a line control circuit 14 which sends or receives packets.

At the transmitting side, voice signals from I/F 3 input to the CODECs 9 are provided for each channel via PBX interface 8. Each CODEC 9-1 to 9-30 codes the voice signals and sends them to PAD 10-1 to 10-30 provided for each channel. Each PAD 10 samples the coded signals and discriminates the upper bits from the lower bits. All upper bits are collected to upper blocks and lower bits are collected to lower blocks. Voice packets are assembled from these blocks by adding a header and are sent to the multiplexer 11. The multiplexer 11 multiplexes the voice packets received from each PAD 10 and stores them into the data memory 12. CPU 13 reads the voice packets stored in the data memory 12 and provides them to the line control circuit 14. The line control circuit 14 sends the voice packets to I/F 5 in accordance with the layer 2 protocol.

On the other hand, at the receiving side, voice packets received from I/F 5 are input to the PAD 10 provided for each channel via multiplexing part 15. Each PAD 10 disassembles the voice packets into packets containing upper blocks and other packets containing lower blocks. Each PAD 10 rearranges these packets to the coded voice data for each sample and then transmits them to its corresponding CODEC 9. Each CODEC 9 decodes the coded voice data into voice signals and sends them to I/F 3 via the PBX interface 3.

But, in the prior voice packet assembling/disassembling apparatus, it was necessary to provide PAD parts for each channel. In the result, the configuration of the PAD parts becomes very large and expensive.

SUMMARY OF THE INVENTION

It is an object of the present invention to provide a small and economical voice packet assembling/disassembling apparatus comprising a packet assembling means which receives coded voice data from a CODEC provided for each channel and assembles voice packets from the coded voice data, and a packet disassembling means which disassembles voice packets to the coded voice data and sends them to a CODEC provided for each channel.

BRIEF DESCRIPTION OF THE DRAWINGS

The operation and advantages of the present invention will be more fully understood from the detailed description below, which should be read in conjunction with the accompanying drawings in which.

DETAILED DESCRIPTION OF THE PREFERRED EMBODIMENTS

Figure 1:
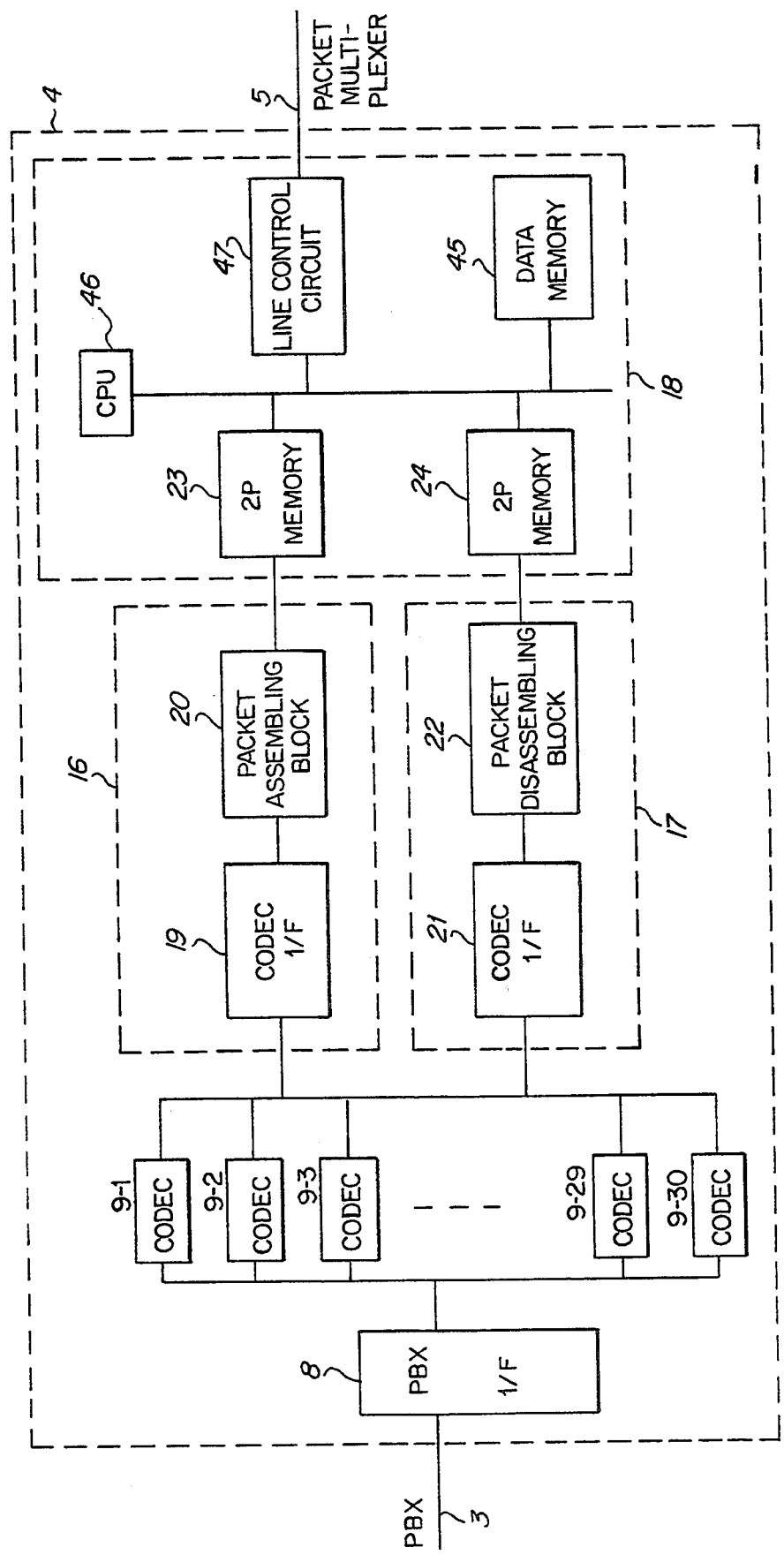
FIG. 1 is a block diagram showing an embodiment of a voice packet assembling/disassembling apparatus of the present invention.

One embodiment of the present invention will hereinafter be described with reference to FIGS. 1 and 2. FIG. 1 illustrates one embodiment of a voice packet assembling/disassembling part of the present invention. As illustrated in FIG. 1, CODEC 9 is connected to a packet assembling part 16 and a packet disassembling part 17 which are features of the present invention. The packet assembling part 16 and the packet disassembling part 17 are both connected to a voice packet transmitting and receiving part 18.

The packet assembling part 16 comprises a CODEC interface 19 connected to CODECs 9 provided for each channel and a packet assembling block 20 which assembles the coded voice data via CODEC interface 19 to the voice packets. The packet disassembling part 17 comprises a CODEC interface 21 connected to CODECs 9 provided for each channel and a packet disassembling block 22 which disassembles voice packets received from the voice packet transmitting and receiving part 18 and supplies the coded voice data to CODECs 9 provided for each channel.

The voice packet transmitting and receiving part 18 comprises a two port memory 23, 24 which are connected to the packet assembling block 20 and the packet disassembling block 22, respectively, and data memory 45, CPU 46 and line control circuit 47 which are generally similar to the prior art.

Operation of this embodiment of the invention is explained below for the transmitting side. When the voice signals are supplied from a PBX 2 (not shown in the figures), the voice signals are coded to embedded ADPCM in each CODEC 9. The coded voice data are input to the packet assembling block 20 through CODEC interface 19. Packet assembling block 20 assembles the packets and sends them to 2P memory 23.

Figure 2:
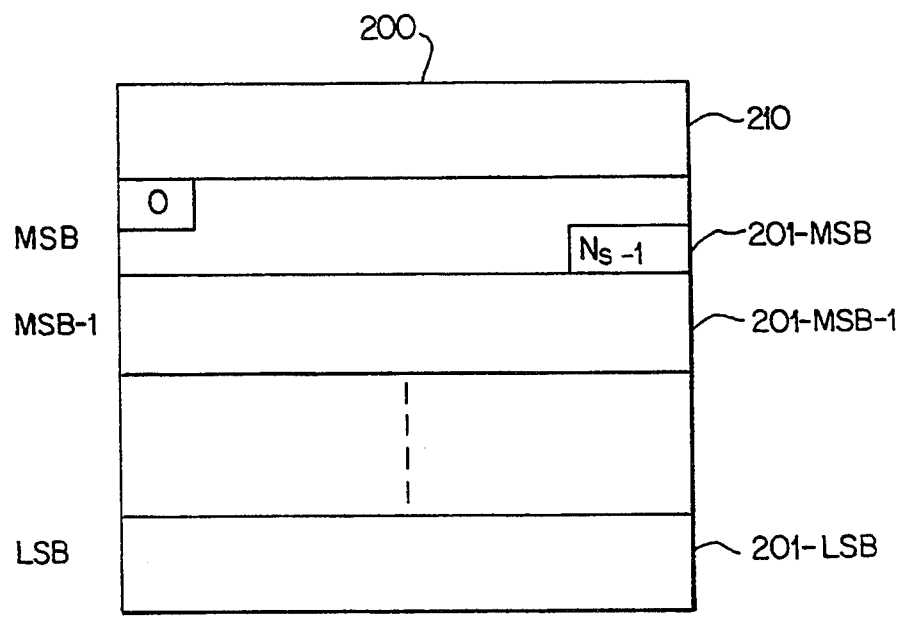
FIG. 2 shows an assembling and disassembling process in the voice packet assembling/disassembling apparatus of the present invention.
Figure 2:
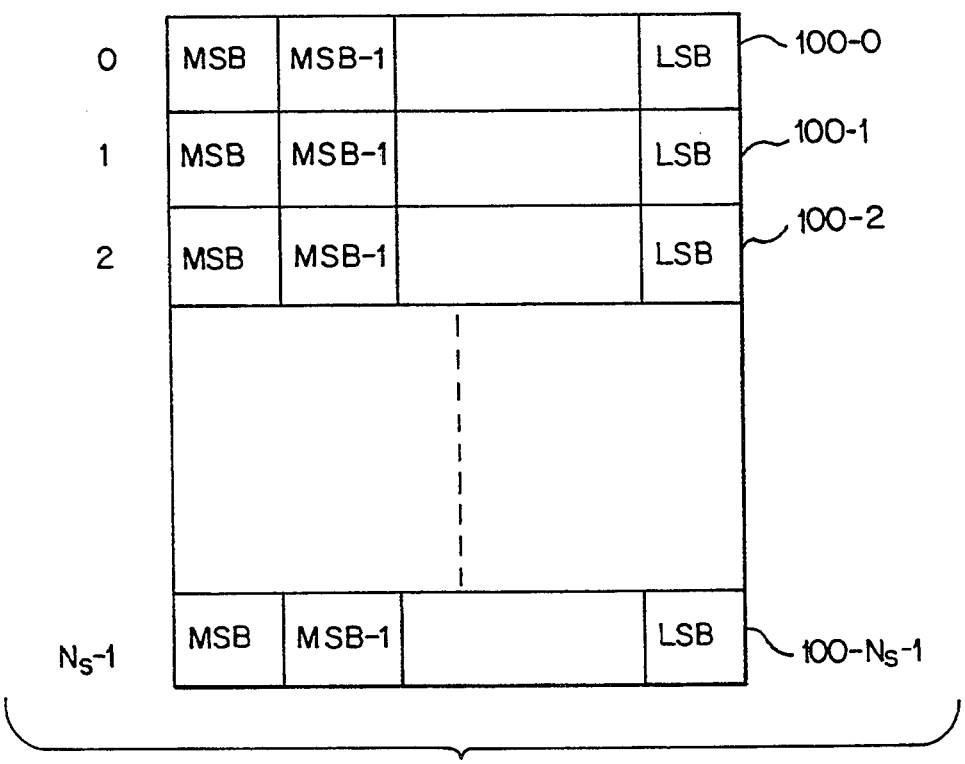
Figure 3:
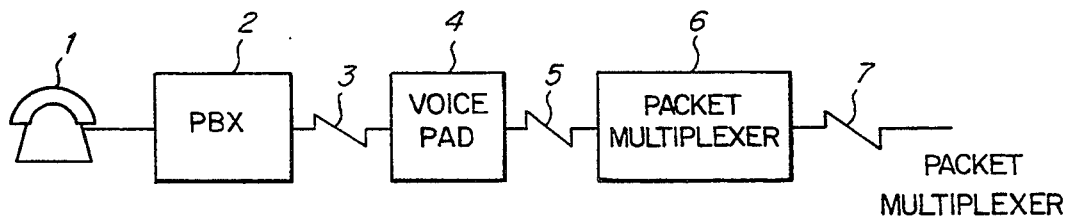
FIG. 3 is a block diagram of a voice packet communications system.
Figure 4:
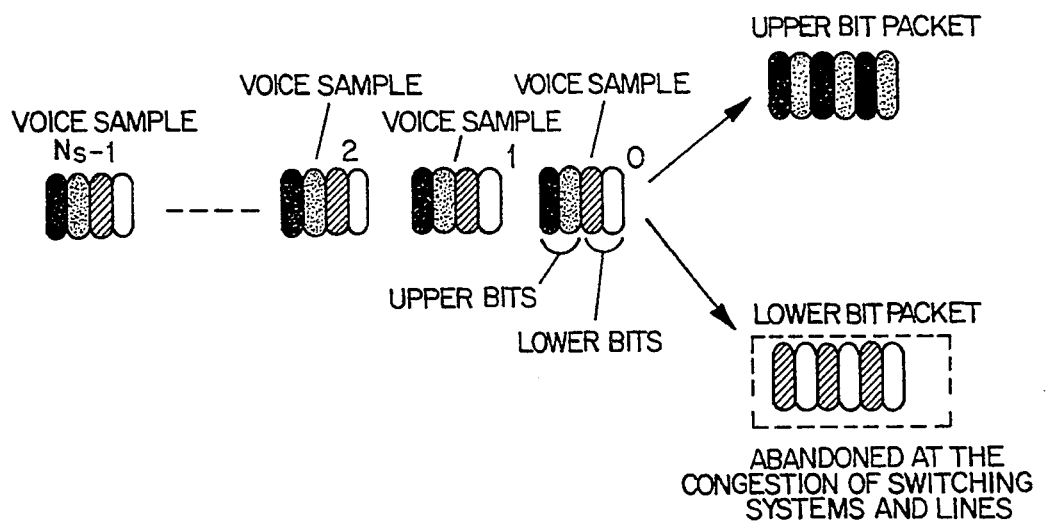
FIG. 4 shows a prior interleave process for assembling/disassembling packets containing upper bits and lower bits, respectively.
Figure 5:
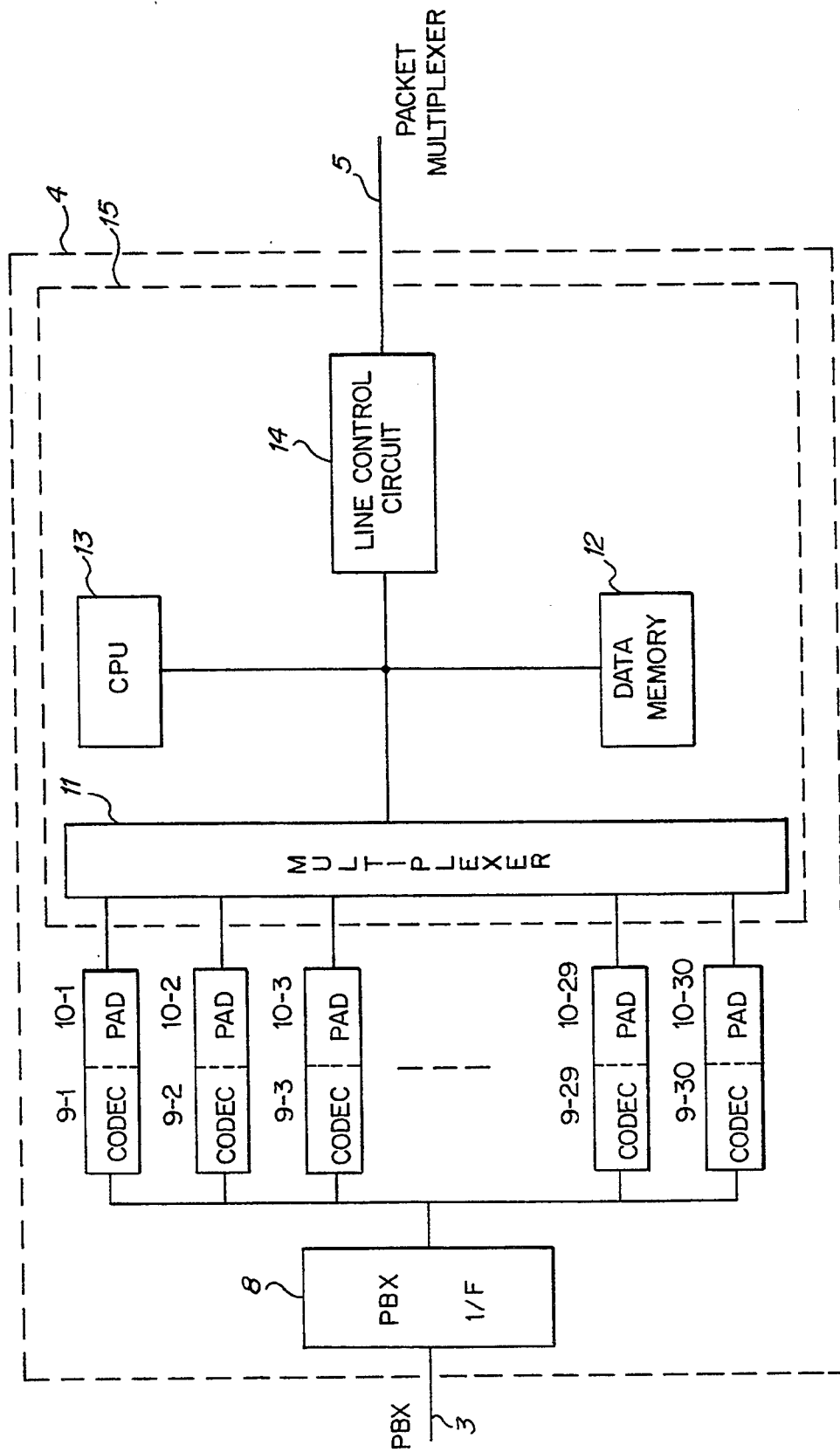
FIG. 5 is a block diagram of a voice packet apparatus of the prior art.

FIG. 2 illustrates assembling and disassembling processes of the present invention. In FIG. 2, coded voice data of Ns samples are constructed from the output of the channels of CODECs 9. Packet assembling block 20 assembles one voice packet 200 by rearranging the bit array of the coded voice data 100 of Ns samples. More precisely, one block 201-MSB is assembled from the Most Significant Bits (MSB) extracted from the coded voice data of Ns samples. In the same way, next block 201-MSB−1 is assembled from the MSB−1 bits extracted from the coded voice data of Ns samples. The same assembling processes are carried on by extracting the bits on the same position of the coded voice data of Ns samples. At last block 201-LSB is assembled only from the Last Significant Bits (LSB) extracted from the coded voice data of Ns samples. One voice packet 200 is assembled by collecting each block 201-MSB, 201-MSB−1, . . . , 201-LSB and adding header 210 which contains coding rules and some other information.

In the above description, MSB is the most influential bit and MSB−1 is a subsequent influential bit, and LSB is the least influential bit for the voice quality.

In FIG. 1, the voice packets assembled in this manner are stored once into the data memory 45 via 2P memory 23, and then supplied to the line control circuit 47 under control of CPU 46, and then supplied to a packet multiplexer 6 (not shown in the figure) via I/F 5 in accordance with the layer 2 protocol. The packet multiplexer 6 multiplexes the input packets and sends them to a high speed digital switch 7, not shown in the figure. When the packet multiplexer 6 is congested, the packet multiplexer 6 abandons the lower block 201 in the voice packet 200, for example 201-LSB, in order to abate the congestion, and sets information in the header 210 indicating that the 201-LSB is abandoned.

Operation of this embodiment of the invention is explained below for the receiving side. The signals go through the system in the opposite direction compared to the transmitting side. Namely, the voice packet 200 is input to the packet disassembling block 22 via 2P memory 24. The packet disassembling block 22 disassembles the voice packet 200, and restores the coded voice data 100 corresponding Ns samples using the bits in the block 201 and the block abandonment information in the header 210.

If the blocks corresponding to the lower bits are abandoned by a congested multiplexer 6 in order to abate congestion, the coded voice data 100 of Ns samples constructed only MSB and MSB−1 bit are restored from MSB block (201-MSB) and MSB−1 block (201-MSB−1) corresponding to the upper bits, by using the header 210 which contains the abandonment information of the lower block 201, for example 201-LSB. The restored coded voice data 100 of Ns samples input to CODECs 9 provided for each channel in order of 0, 1 . . . , Ns−1 via CODEC interface 21 and are decoded to voice signals. The decoded voice signals input to PBX 2 via PBX interface 8 and interface I/F 3.

In the prior art, PAD parts 10 are provided for each channel. But in the present invention, only one assembling block 20 and one packet disassembling block 22 are provided in one PAD apparatus. Therefore, this invention provides a very small and economical voice PAD apparatus.

What is claimed is:

1. A voice packet assembling/disassembling apparatus for a voice communication system having a voice terminal of a plurality of channels, the apparatus comprising:

a plurality of CODECs each having a first terminal connected to a different channel of the voice terminal and a second terminal wherein input voice signals received from the voice terminal are coded for each channel;

a packet assembler, having one input connected to the second terminal of each of the plurality of CODECs, for receiving said coded voice signals from the plurality of CODECs and for assembling said coded voice signals into voice packets, and including means for rearranging bits in an information part of a voice packet so as to enable abandonment of part of the coded voice data, and for providing voice packets to a packet multiplexer;

a packet disassembler for receiving input voice packets through the packet multiplexer and for disassembling said received input voice packets into coded voice signals and including means for rearranging bits in the information part of a received input voice packet to obtain the corresponding coded voice signal and having one output connected to the second terminal of each of the plurality of CODECs; and said plurality of CODECs decoding said coded voice signals into voice signals for each channel and for providing said voice signals to the voice terminal.

2. The voice packet assembling/disassembling apparatus of claim 1, wherein said packet assembler collects a plurality of bits which are located at the same bit position in a first number of samples received from said CODECs for making a plurality of blocks, and assembles voice packets from said plurality of blocks by adding a header block.

3. The voice packet assembling/disassembling apparatus of claim 2 wherein said packet disassembler disassembles voice packets including a header block into a plurality of blocks which contain different bit position data respectively, and restores coded data of the first number of samples from said plurality of blocks corresponding to each channel.

4. The voice packet assembling/disassembling apparatus of claim 1, wherein said packet assembler disassembles voice packets including a header block into a plurality of blocks which contain different bit position data respectively, and restores coded data of a first number of samples from said plurality of blocks corresponding to each channel.

5. The voice packet assembling/disassembling apparatus of claim 1, further comprising:
a first single CODEC interface, connected to receive coded voice data from the plurality of CODECs, and wherein the packet assembler receives said coded voice signals from the CODEC interface; and
a second single CODEC interface connected to the packet disassembler for receiving coded voice signals therefrom and for providing the coded voice signals to said plurality of CODECs.

6. The apparatus of claim 5, wherein the packet assembler includes means for collecting a plurality of bits which are located at the same bit position from a first number of samples received through said first CODEC interface;
means, responsive to the means for collecting, for making a plurality of blocks from the collected plurality of bits; and
means, responsive to the means for collecting and means for making, for assembling voice packets from said plurality of blocks by adding a header block.

7. The apparatus of claim 6, wherein said packet disassembler includes means for disassembling voice packets, including a header block, into a plurality of blocks, wherein each block contains different bit position data, and
means for restoring coded data of a first number of samples from said plurality of blocks, corresponding to each channel.

8. The apparatus of claim 5, further comprising a two part memory for receiving assembled packets from the packet assembler and for providing assembled packets to the packet disassembler;
and a line control means for providing and receiving assembled packets to and from the packet multiplexer.

9. The apparatus of claim 8, wherein the packet assembler includes means for collecting a plurality of bits which are located at the same bit position from a first number of samples received through said first CODEC interface;
means, responsive to the means for collecting, for making a plurality of blocks from the collected plurality of bits; and
means, responsive to the means for collecting and means for making, for assembling voice packets from said plurality of blocks by adding a header block.

10. The apparatus of claim 9, wherein said packet disassembler includes means for disassembling voice packets, including a header block, into a plurality of blocks, wherein each block contains different bit position data, and
means for restoring coded data of a first number of samples from said plurality of blocks, corresponding to each channel.

11. A voice packet assembling/dissembling apparatus for a voice communication system having a voice terminal of a plurality of channels, the apparatus comprising:
a plurality of CODECs each having a first terminal connected to a different channel of the voice terminal and a second terminal for receiving voice data from the voice terminal and for coding said voice data;
one packet assembler/disassembler, having one input connected to the second terminal of each of the plurality of CODECs, for receiving said coded voice data from said plurality of CODECs and assembling said coded voice data into voice packets, and including means for rearranging bits in an information part of a voice packet so as to enable abandonment of part of the coded voice data and for providing voice packets to a packet multiplexer to be provided to a packet multiplexer and means for receiving voice packets from the packet multiplexer and disassembling said voice packets into coded voice data, and including means for rearranging bits in the information part of a voice packet to obtain the corresponding coded voice signal and having one output connected to the second terminal of each of the plurality of CODECs;
said plurality of CODECs also receiving coded voice data from said packet assembler/disassembler and decoding said data into voice data to be provided to the voice terminal.

12. A voice packet assembling/disassembling apparatus as set forth in claim 11, wherein said means for assembling coded voice data into voice packets collects a plurality of bits which are located at the same bit position in a first number of samples received from said CODECs for making a plurality of blocks, said voice packets being assembled from said plurality of blocks and a header block.

13. The voice packet assembling/disassembling apparatus of claim 12, wherein voice packets include a header block and said means for disassembling disassembles voice packets into a plurality of blocks, wherein each block contains different bit position data, and restores coded data of the first number of samples from said plurality of blocks corresponding to each channel.

14. The voice packet assembling/disassembling apparatus of claim 11 wherein voice packets include a header block and said means for disassembling disassembles voice packets into a plurality of blocks, wherein each block contains different bit position data, and restores coded data of the first number of samples from said plurality of blocks corresponding to each channel.

* * * * *

UNITED STATES PATENT AND TRADEMARK OFFICE
CERTIFICATE OF CORRECTION

PATENT NO. : 5,379,293

DATED : January 3, 1995

INVENTOR(S) : Shin Kanno, Tsukasa Tsujimura, Masatsugu Yano, Hidenori Aoyagi & Hiroshi Kawawata It is certified that error appears in the above-identified patent and that said Letters Patent is hereby corrected as shown below:

On the title page, item: [73]

Please add "Assignee: Nippon Telegraph and Telephone Corporation and Mitsubishi Denki Kabushiki Kaisha, both of Tokyo, Japan"

Signed and Sealed this

Twelfth Day of September, 1995

Attest:

BRUCE LEHMAN

Attesting Officer

Commissioner of Patents and Trademarks